(12) United States Patent
Spanknoble

(10) Patent No.: US 10,041,518 B1
(45) Date of Patent: Aug. 7, 2018

(54) CAPTIVE SCREW

(71) Applicant: HEARTLAND PRECISION FASTENERS, INC., New Century, KS (US)

(72) Inventor: Edward Carl Spanknoble, Gardner, KS (US)

(73) Assignee: Heartland Precision Fasteners, Inc., New Century, KS (US)

( * ) Notice: Subject to any disclaimer, the term of this patent is extended or adjusted under 35 U.S.C. 154(b) by 0 days.

(21) Appl. No.: 15/401,899

(22) Filed: Jan. 9, 2017

(51) Int. Cl.
  *F16B 35/02* (2006.01)
  *F16B 5/02* (2006.01)
  *F16B 35/00* (2006.01)

(52) U.S. Cl.
  CPC ........... *F16B 5/0208* (2013.01); *F16B 35/00* (2013.01)

(58) Field of Classification Search
  CPC .............................. F16B 5/0208; F16B 35/00
  USPC .......................................... 411/340, 383, 916
  See application file for complete search history.

(56) References Cited

U.S. PATENT DOCUMENTS

| | | | | |
|---|---|---|---|---|
| 1,346,578 A | * | 7/1920 | Windsor | F16B 13/0808 411/340 |
| 1,353,159 A | * | 9/1920 | Hammermann | F16B 13/0808 411/340 |
| 1,404,914 A | * | 1/1922 | Van Winkle | B25B 31/005 411/340 |
| 3,159,075 A | * | 12/1964 | Bjork | F16B 35/02 411/271 |
| 4,934,884 A | * | 6/1990 | Rooke | H05K 7/1412 411/14 |
| 5,224,788 A | * | 7/1993 | Freed | B42F 13/12 402/53 |
| 5,338,139 A | | 8/1994 | Swanstrom | |
| 5,382,124 A | | 1/1995 | Frattarola | |
| D357,176 S | | 4/1995 | Ernest et al. | |
| 5,624,221 A | * | 4/1997 | Poe | B64D 29/00 411/383 |
| 6,079,923 A | | 6/2000 | Ross et al. | |
| 6,468,012 B2 | | 10/2002 | Ellis et al. | |
| 6,761,521 B2 | | 7/2004 | McCormack et al. | |
| 8,794,889 B2 | | 8/2014 | Aukzemas et al. | |

(Continued)

OTHER PUBLICATIONS

Southco® Captive Fasteners Product Specifications, available at http://www.southco.com/static/Literature/51-53-58.en.pdf, admitted prior art.

(Continued)

*Primary Examiner* — Gary W Estremsky
(74) *Attorney, Agent, or Firm* — Lathrop Gage L.L.P.

(57) ABSTRACT

One fastener has a shaft with proximal and distal ends. Threading extends along the shaft from the distal end, and a head is at the proximal end. A channel passes entirely through the shaft such that a first lateral portion of the shaft is on one side of the channel and a second lateral portion of the shaft is on an opposite side of the channel. The channel is inset from the distal end. A hollow area in the shaft extends from the distal end toward the proximal end. The hollow area has a width that is greater than a width of the channel, and a biasing member is positioned inside the hollow area. An insert has an interior portion and an exterior portion. The interior portion is configured for positioning in the channel and the hollow area, and the exterior portion is configured to be located outside the shaft.

34 Claims, 7 Drawing Sheets

(56) References Cited

U.S. PATENT DOCUMENTS

| | | | |
|---|---|---|---|
| 8,945,184 B2* | 2/2015 | Hess | A61B 17/7062 |
| | | | 606/249 |
| 9,285,075 B2 | 3/2016 | Moody et al. | |
| 2006/0182514 A1* | 8/2006 | Ito | F16B 5/02 |
| | | | 411/340 |
| 2011/0072630 A1 | 3/2011 | Bentrim et al. | |
| 2012/0328392 A1 | 12/2012 | Difante | |
| 2013/0312243 A1 | 11/2013 | Andews | |
| 2013/0330147 A1 | 12/2013 | Andrews | |

OTHER PUBLICATIONS

Southco® Captive Screws (Heat Sink Series) Product Specifications, available at http://www.southco.com/static/Literature/5t.en.pdf, admitted prior art.

\* cited by examiner

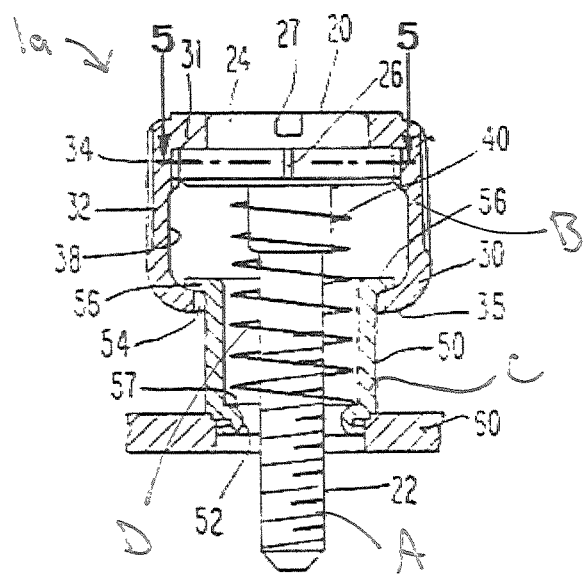
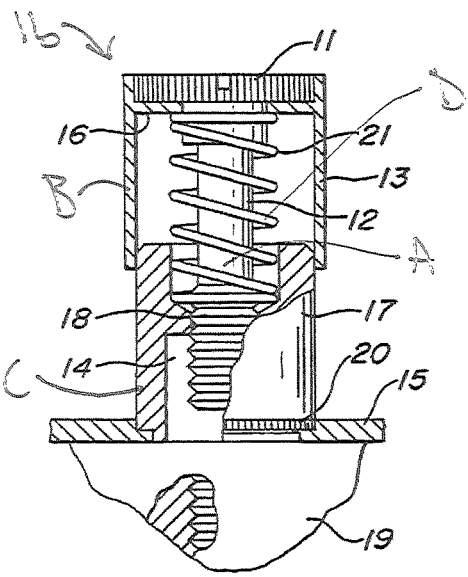
FIG. 1a
PRIOR ART
FIG. 1b
PRIOR ART
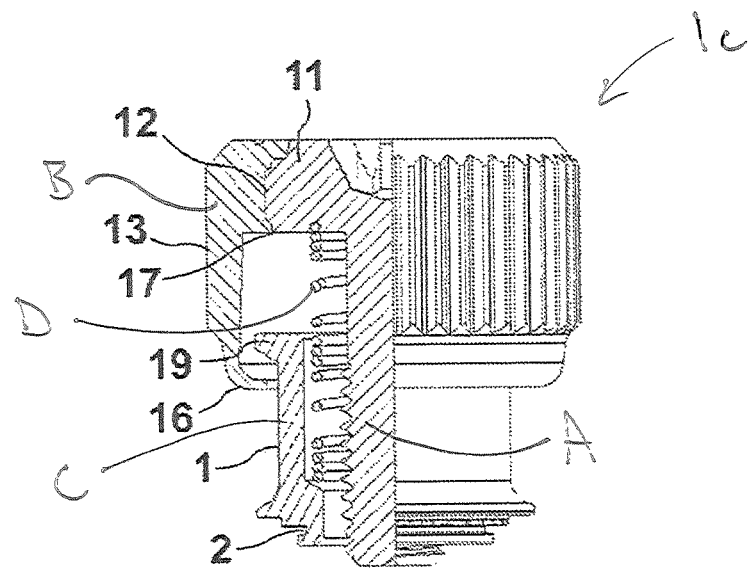
FIG. 1c
PRIOR ART

CAPTIVE SCREW

BACKGROUND

FIG. 1a illustrates a PRIOR ART captive screw 1a disclosed in U.S. Pat. No. 6,468,012; FIG. 1b illustrates a PRIOR ART captive screw 1b disclosed in U.S. Pat. No. 5,338,139; and FIG. 1c illustrates a PRIOR ART captive screw 1c disclosed in US 2011/0072630. As is common with one type of prior art captive screws, captive screws 1a, 1b, and 1c each include a screw A, a cap B, a ferrule C, and a spring D. The spring D is housed outside the screw A, though inside the cap B and the ferrule C. FIG. 1d illustrates another PRIOR ART captive screw 1d, disclosed in U.S. Pat. No. 8,794,889, and FIG. 1e illustrates a PRIOR ART captive screw 1e, disclosed in U.S. Pat. No. 6,761,521. Similar to the captive screws 1a, 1b, and 1c, the captive screws 1d and 1e similarly include a screw A, a ferrule C, and a spring D outside the screw A; however, as is common with a second type of prior art captive screws, the cap B is omitted such that the spring D outside the screw A is exposed. Any numbers appearing in FIGS. 1a through 1e not noted above are simply reproduced from the original documents and do not correspond to any numbers used herein; thus, they should be ignored.

Various embodiments of the current invention relate to captive screws (sometimes called captive panel fasteners), to assemblies having such fasteners, and to methods of using such fasteners.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a fastener has a shaft with proximal and distal ends. Threading extends along the shaft from the distal end, and a head is at the proximal end. The head has an enlarged diameter relative to the shaft. A channel passes entirely through the shaft such that a first lateral portion of the shaft is on one side of the channel and a second lateral portion of the shaft is on an opposite side of the channel. The channel is inset from the distal end. A hollow area in the shaft extends from the distal end toward the proximal end. The hollow area has a width that is greater than a width of the channel, and a biasing member is positioned inside the hollow area. An insert has an interior portion and an exterior portion. The interior portion is configured for positioning in the channel and the hollow area, and the exterior portion is configured to be located outside the shaft.

According to another embodiment, a fastener has a shaft with proximal and distal ends. Threading extends along the shaft from the distal end, and a head is at the proximal end. The head has an enlarged diameter relative to the shaft. A channel passes entirely through the shaft and divides the shaft into first and second lateral portions. The channel is inset from the distal end. A hollow area in the shaft extends from the distal end toward the proximal end. The hollow area has a width that is greater than a width of the channel, and a biasing member is positioned inside the hollow area. An insert is configured for passing through the channel and bookending the shaft.

According to still another embodiment, a fastener has a shaft with proximal and distal ends. Threading extends along the shaft from the distal end, and a head is at the proximal end. The head has an enlarged diameter relative to the shaft. A channel passes entirely through the shaft and divides the shaft into first and second lateral portions. The channel is inset from the distal end. An insert passes through the channel and bookends the shaft. The insert is movable along the channel.

According to yet another embodiment, a fastener has a shaft with proximal and distal ends. Threading extends along the shaft from the distal end, and a head is at the proximal end. The head has an enlarged diameter relative to the shaft. A channel passes entirely through the shaft and divides the shaft into first and second lateral portions. The channel is inset from the distal end. An insert passes through the channel and bookends the shaft. The insert is movable along the channel. Means are included for biasing a position of the insert, and the biasing means are located entirely inside the shaft.

According to still yet another embodiment, a captive screw has a shaft with proximal and distal ends. Threading extends along the shaft from the distal end, and a head is at the proximal end. The head has an enlarged diameter relative to the shaft. A channel passes entirely through the shaft and divides the shaft into first and second lateral portions. The channel is inset from the distal end. An insert passes through the channel and bookends the shaft. The insert is movable along the channel, and a depth of the insert is smaller than a width of the channel. A biasing member is positioned inside the shaft, and the biasing member contacts the insert. The captive screw does not include a ferrule.

According to a further embodiment, a captive screw consists of a shaft, a head, a channel, an insert, and a biasing member. The shaft has proximal and distal ends. Threading extends along the shaft from the distal end, and the head is at the proximal end. The head has an enlarged diameter relative to the shaft. The channel passes entirely through the shaft and divides the shaft into first and second lateral portions. The channel is inset from the distal end. The insert passes through the channel and bookends the shaft. The insert is movable along the channel, and a depth of the insert is smaller than a width of the channel. The biasing member is positioned inside the shaft, and the biasing member contacts the insert.

BRIEF DESCRIPTION OF THE DRAWINGS

FIGS. 1a-1e illustrate PRIOR ART captive screws.

DETAILED DESCRIPTION

Figure 1D:
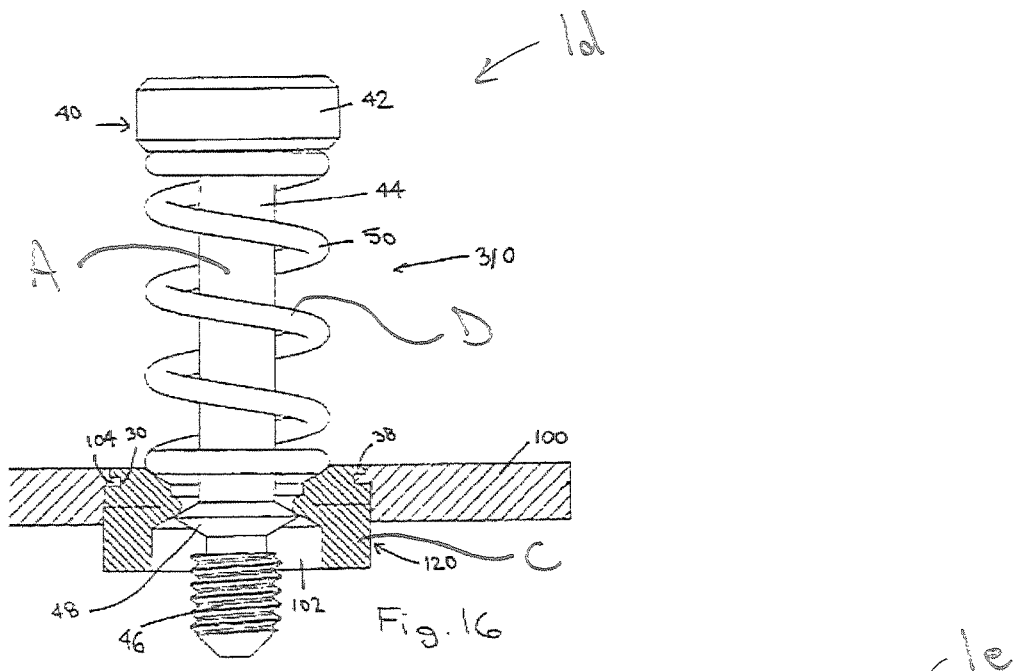
Figure 1E:
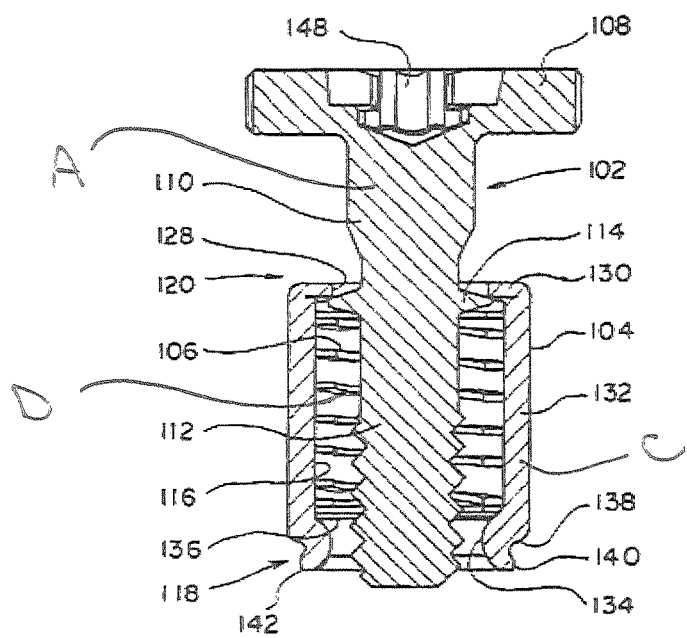

FIGS. 2-6 illustrate a fastener 100, and more particularly a captive screw, according to an embodiment of the current invention. The captive screw 100 includes a shaft 110 having proximal and distal ends 112a, 112b. Threading 113 extends along the shaft 110 from the distal end 112b. In some embodiments, the threading 113 extends only partially toward the proximal end 112a, while in other embodiments the threading 113 extends all the way to the proximal end 112a. A head 115 is located at the proximal end 112a. As is typical with screws ("screws" is used herein generically, such that sharp-tipped threaded fasteners as well as flat-tipped threaded fasteners, sometimes called bolts, are included), the head 115 has an enlarged diameter—here, relative to the shaft 110. The head 115 may be configured to receive a driving (installing) tool, such as a screwdriver or a wrench.

Figure 6:
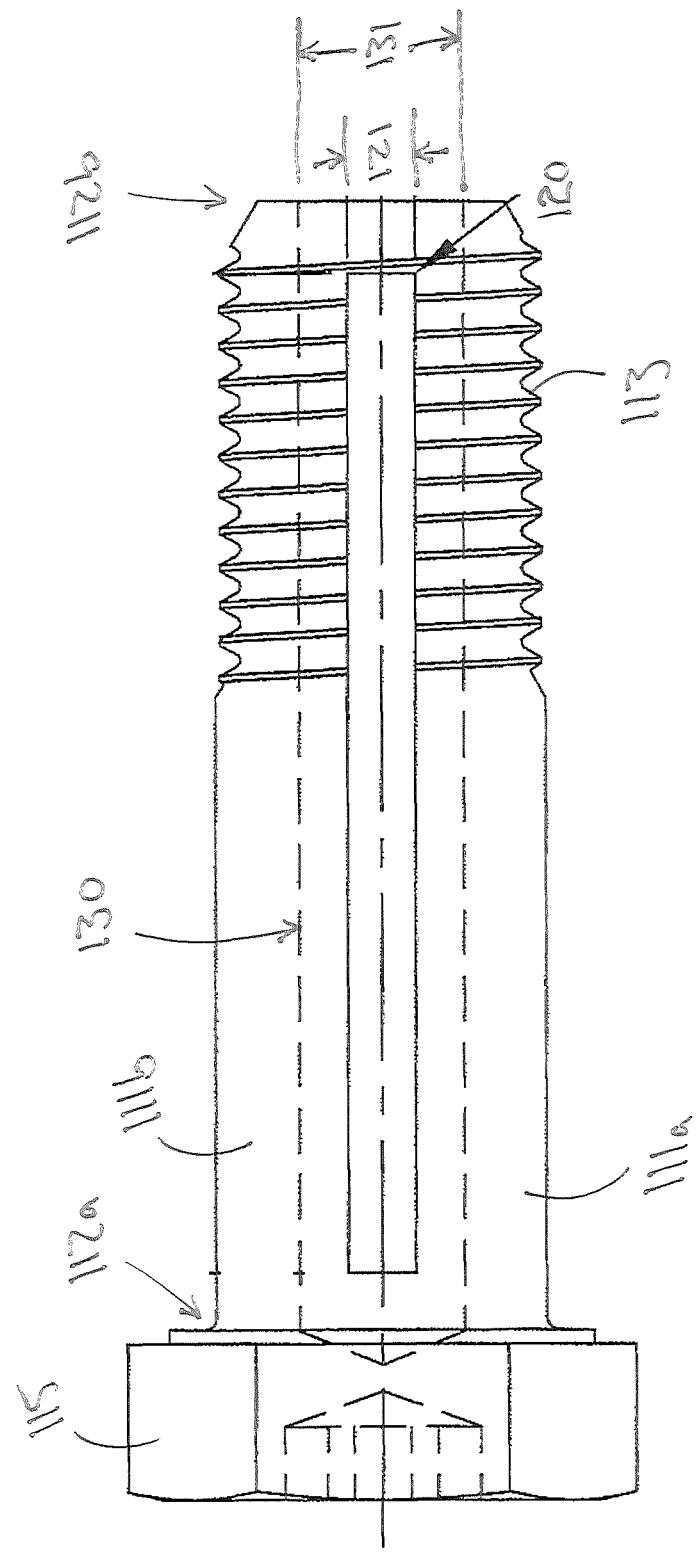
FIG. 6 is a side view of the fastener of FIG. 2, with the insert and the biasing member being omitted for illustration.

A channel 120 is inset from the distal end 112b and passes entirely through the shaft 110. The channel 120 divides the shaft 110 into first and second lateral portions 111a, 111b such that the first portion 111a is on one side of the channel 120 and the second portion 111b is on an opposite side of the channel 120. The channel 120 may be machined into the shaft 110, or the shaft 110 may be formed to have the channel 120. The channel has a width 121, as shown in FIG. 6.

As shown in FIGS. 2-6, the fastener 100 has a hollow area 130 in the shaft 110 extending from the distal end 112b toward the proximal end 112a. The hollow area 130 has a width 131 (FIG. 6) that is greater than the channel width 121. The hollow area 130 in embodiment 100 has a circular shape when viewed from the distal end 112b, and may be created by a drill passing from the distal end 112b toward the proximal end 112a. In other embodiments, the shaft 110 may be cast or otherwise formed with the hollow area 130, and the hollow area 130 may be non-circularly shaped when viewed from the distal end 112b.

An insert 140 is configured for passing through the channel 120 and bookending the shaft 110, and the insert 140 may preferably be movable from an initial position separate from the shaft 110 to an installed position (FIGS. 3 and 4) in which the insert 140 passes through the channel 120 and bookends the shaft 110. When installed, the insert 140 is movable along the channel 120. As shown in FIGS. 2-5, the insert 140 has an interior portion 142 and two exterior portions 144. The interior portion 142 is configured for positioning in the channel 120 and the hollow area 130, and is positioned accordingly when installed. The interior portion 142 may be linear with a circular segment 143 centered therealong, such that opposed sides defined by a major axis 145 of the insert 140 are mirror images of one another. The circular segment 143 is located in the hollow area 130 when installed. In embodiments where the hollow area 130 is not circular when viewed from the distal end 112b, it may be desirable for the segment 143 to have a complementary, non-circular shape. Turning now to the exterior portions 144, the exterior portions 144 are located outside the shaft 110 when the insert 140 is installed. Each exterior portion 144 may have an outermost perimeter 144a that is generally arcuate. The insert 140 may be generally flat at faces 146a, 146b, and the depth of the insert 140 (the distance between the faces 146a, 146b) is smaller than the channel width 121.

A biasing member 150 (FIGS. 4 and 5) may be positioned inside the shaft 110, and it may be particularly desirable for the biasing member 150 to be positioned entirely inside the shaft 110 (e.g., inside the hollow area 130) and in contact with the insert 140 when the insert 140 passes through the channel 120. The biasing member 150 may be, for example, a helical spring, a gas or hydraulic spring, or a magnetic component.

Figure 2:
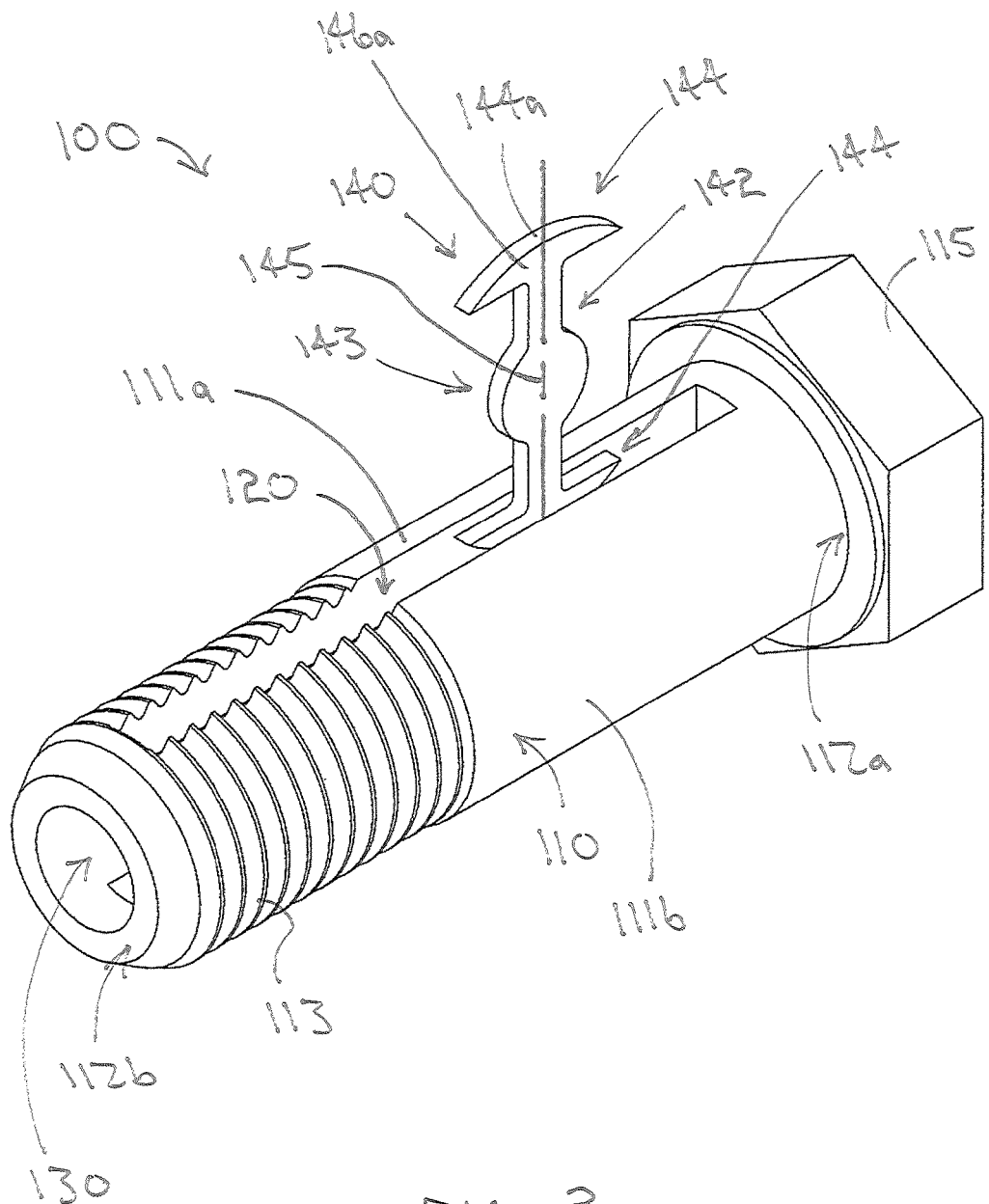
FIG. 2 is a perspective view of a fastener, according to an embodiment of the current invention, shown with the insert partially installed.
Figure 3:
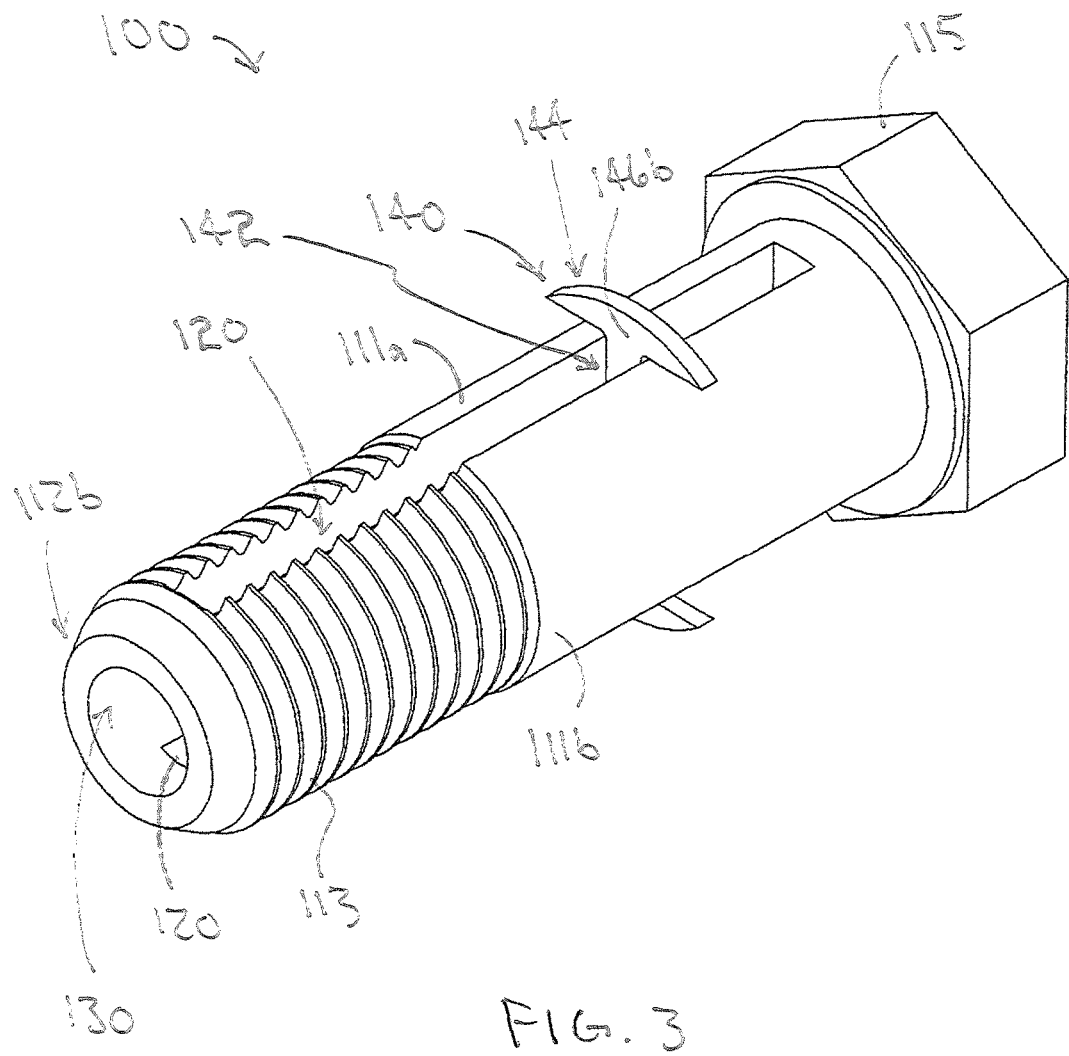
FIG. 3 is another perspective view of the fastener of FIG. 2, shown with the insert fully installed.
Figure 4:
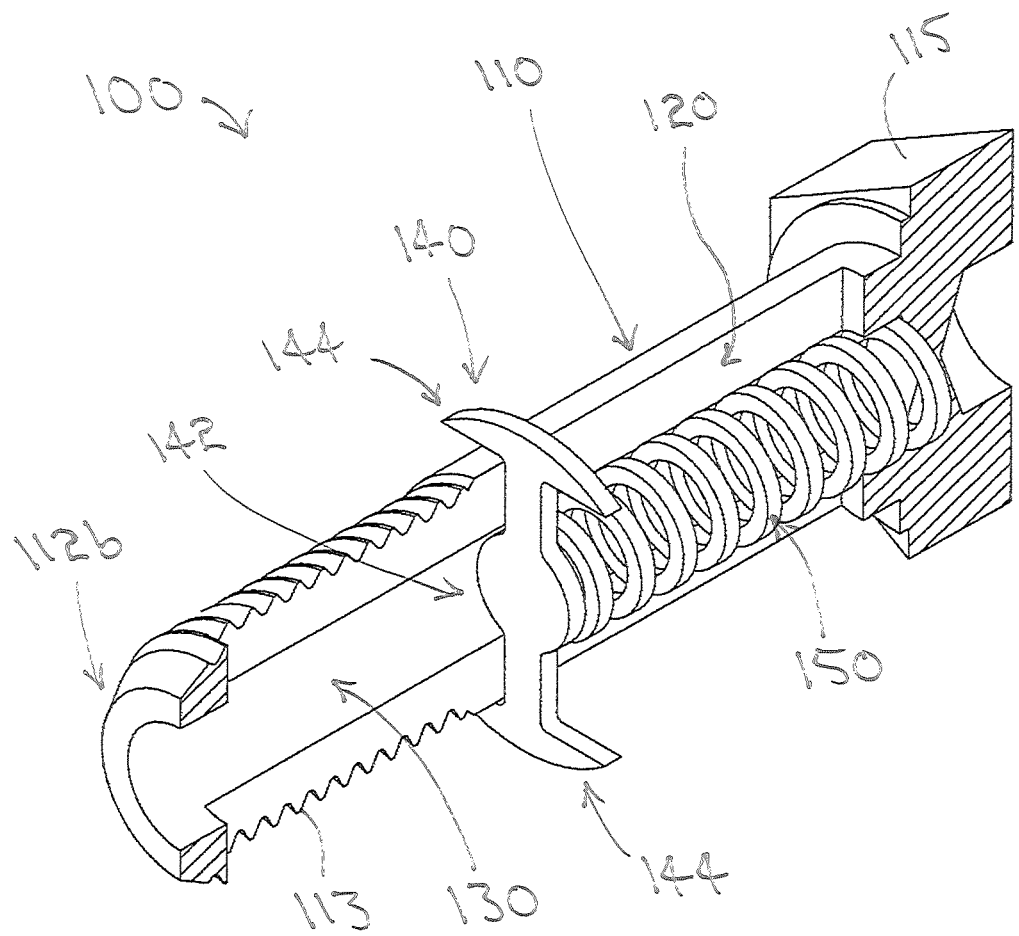
FIG. 4 is a section view of the fastener of FIG. 2, shown with the insert fully installed.
Figure 5:
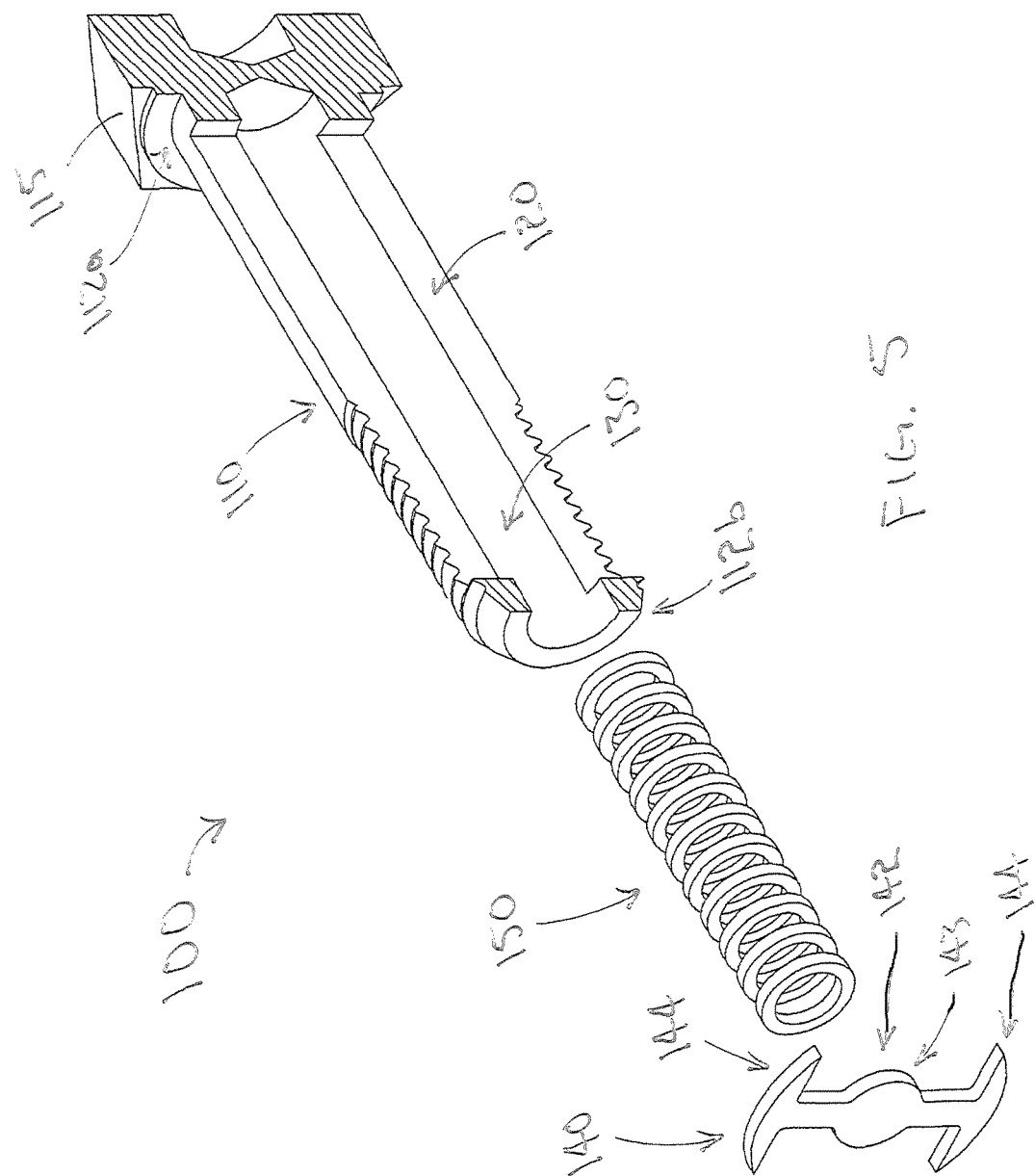
FIG. 5 is an exploded view of the fastener of FIG. 2, with the screw and the head being shown in section.

In use, the shaft 110 of the captive screw 100 is placed through a panel (e.g., an aircraft panel) or other structure. The insert 140 is then moved into the channel 120, as shown in FIG. 2, until the circular segment 143 is aligned with the hollow area 130 and the exterior portions 144 are outside the shaft 110. The insert 140 is then rotated ninety degrees, as shown in FIGS. 3 and 4. In some embodiments, the biasing member 150 must be compressed before the insert 140 is moved into the channel 120. Once installed, the insert 140 can move along the channel 120. But because the channel 120 ends before reaching the distal end 112b, the insert 140 is prevented from exiting through the distal end 112b. The biasing member 150 contacts the insert 140 and separates the insert 140 from the head 115 by a desired distance. The threads 113 may then be used to fasten the shaft 110, and thus the panel, to backing structure (e.g., a nut attached to, or formed in, another panel). If the captive screw 100 is subsequently separated from the backing structure, the insert 140 and the head 115 may prevent the captive screw 100 from separating from the panel. Very notably, the biasing member 150 stays out of the way when in use because of its position inside the shaft 110. And, unlike the prior art fasteners, the captive screw 100 does not include a ferrule.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A fastener, comprising:
   a shaft having proximal and distal ends;
   threading along the shaft, the threading extending from the distal end;
   a head at the proximal end, the head having an enlarged diameter relative to the shaft;
   a channel passing entirely through the shaft such that a first lateral portion of the shaft is on one side of the channel and a second lateral portion of the shaft is on an opposite side of the channel, the channel being inset from the distal end;
   a hollow area in the shaft extending from the distal end toward the proximal end, the hollow area having a width that is greater than a width of the channel;
   a biasing member positioned inside the hollow area; and
   an insert having an interior portion and an exterior portion, the interior portion being configured for positioning in the channel and the hollow area, the exterior portion being configured to be located outside the shaft;
   wherein the biasing member is a helical spring.

2. The fastener of claim 1, wherein the insert is generally flat.

3. The fastener of claim 1, wherein the fastener does not include a ferrule.

4. The fastener of claim 1, wherein the insert has a second exterior portion configured to be located outside the shaft.

5. A fastener, comprising:
a shaft having proximal and distal ends;
threading along the shaft, the threading extending from the distal end;
a head at the proximal end, the head having an enlarged diameter relative to the shaft;
a channel passing entirely through the shaft such that a first lateral portion of the shaft is on one side of the channel and a second lateral portion of the shaft is on an opposite side of the channel, the channel being inset from the distal end;
a hollow area in the shaft extending from the distal end toward the proximal end, the hollow area having a width that is greater than a width of the channel;
a biasing member positioned inside the hollow area; and
an insert having an interior portion and an exterior portion, the interior portion being configured for positioning in the channel and the hollow area, the exterior portion being configured to be located outside the shaft;
wherein the insert interior portion is linear and has a circular segment centered therealong such that opposed sides of the insert interior portion are mirror images of one another, the opposed sides being defined along a major axis of the insert.

6. The fastener of claim 5, wherein the insert is generally flat.

7. The fastener of claim 5, wherein the biasing member is selected from the group consisting of a helical spring, a gas spring, a hydraulic spring, and a magnetic component.

8. The fastener of claim 5, wherein the insert has a second exterior portion configured to be located outside the shaft.

9. The fastener of claim 5, wherein the fastener does not include a ferrule.

10. A fastener, comprising:
a shaft having proximal and distal ends;
threading along the shaft, the threading extending from the distal end;
a head at the proximal end, the head having an enlarged diameter relative to the shaft;
a channel passing entirely through the shaft and dividing the shaft into first and second lateral portions, the channel being inset from the distal end;
a hollow area in the shaft extending from the distal end toward the proximal end, the hollow area having a width that is greater than a width of the channel;
a biasing member positioned inside the hollow area; and
an insert configured for passing through the channel and bookending the shaft;
wherein the biasing member is a helical spring.

11. The fastener of claim 10, wherein a depth of the insert is smaller than the width of the channel.

12. The fastener of claim 10, wherein the insert is generally flat.

13. The fastener of claim 10, wherein the fastener does not include a ferrule.

14. A fastener, comprising:
a shaft having proximal and distal ends;
threading along the shaft, the threading extending from the distal end;
a head at the proximal end, the head having an enlarged diameter relative to the shaft;
a channel passing entirely through the shaft and dividing the shaft into first and second lateral portions, the channel being inset from the distal end;
a hollow area in the shaft extending from the distal end toward the proximal end, the hollow area having a width that is greater than a width of the channel;
a biasing member positioned inside the hollow area; and
an insert configured for passing through the channel and bookending the shaft;
wherein the insert is configured to rotate ninety degrees while being located in the channel.

15. The fastener of claim 14, wherein the insert is generally flat.

16. The fastener of claim 14, wherein the biasing member is selected from the group consisting of a helical spring, a gas spring, a hydraulic spring, and a magnetic component.

17. The fastener of claim 14, wherein the fastener does not include a ferrule.

18. A fastener, comprising:
a shaft having proximal and distal ends;
threading along the shaft, the threading extending from the distal end;
a head at the proximal end, the head having an enlarged diameter relative to the shaft;
a channel passing entirely through the shaft and dividing the shaft into first and second lateral portions, the channel being inset from the distal end;
an insert passing through the channel and bookending the shaft, the insert being movable along the channel; and
a biasing member positioned inside the shaft, the biasing member contacting the insert;
wherein the biasing member is a helical spring.

19. The fastener of claim 18, further comprising a hollow area in the shaft extending from the distal end toward the proximal end, the hollow area having a width that is greater than a width of the channel.

20. The fastener of claim 19, wherein the an insert has an interior portion and two exterior portions, the interior portion being positioned in the channel and the hollow area, the exterior portions being located outside the shaft.

21. The fastener of claim 20, wherein the insert exterior portions each have an outermost perimeter that is generally arcuate.

22. The fastener of claim 18, wherein the insert is generally flat.

23. The fastener of claim 18, wherein the fastener does not include a ferrule.

24. A fastener, comprising:
a shaft having proximal and distal ends;
threading along the shaft, the threading extending from the distal end;
a head at the proximal end, the head having an enlarged diameter relative to the shaft;
a channel passing entirely through the shaft and dividing the shaft into first and second lateral portions, the channel being inset from the distal end;
an insert passing through the channel and bookending the shaft, the insert being movable along the channel;
a biasing member positioned inside the shaft, the biasing member contacting the insert; and
a hollow area in the shaft extending from the distal end toward the proximal end, the hollow area having a width that is greater than a width of the channel;
wherein the an insert has an interior portion and two exterior portions, the interior portion being positioned in the channel and the hollow area, the exterior portions being located outside the shaft; and
wherein the insert interior portion is linear and has a circular segment centered therealong such that opposed sides of the insert interior portion are mirror images of one another, the opposed sides being defined along a major axis of the insert.

25. The fastener of claim 24, wherein the insert exterior portions each have an outermost perimeter that is generally arcuate.

26. The fastener of claim 24, wherein the insert is generally flat.

27. The fastener of claim 24, wherein the biasing member is selected from the group consisting of a helical spring, a gas spring, a hydraulic spring, and a magnetic component.

28. The fastener of claim 24, wherein the fastener does not include a ferrule.

29. A fastener, comprising:
   a shaft having proximal and distal ends;
   threading along the shaft, the threading extending from the distal end;
   a head at the proximal end, the head having an enlarged diameter relative to the shaft;
   a channel passing entirely through the shaft and dividing the shaft into first and second lateral portions, the channel being inset from the distal end;
   an insert passing through the channel and bookending the shaft, the insert being movable along the channel;
   a biasing member positioned inside the shaft, the biasing member contacting the insert; and
   a hollow area in the shaft extending from the distal end toward the proximal end, the hollow area having a width that is greater than a width of the channel;
   wherein the an insert has an interior portion and two exterior portions, the interior portion being positioned in the channel and the hollow area, the exterior portions being located outside the shaft; and
   wherein the insert interior portion is linear and has a circular segment centered therealong, the circular segment being located in the hollow area.

30. The fastener of claim 29, wherein the insert is rotatable in the channel.

31. The fastener of claim 29, wherein a depth of the insert is smaller than the width of the channel.

32. The fastener of claim 22, wherein the insert is generally flat.

33. The fastener of claim 22, wherein the biasing member is selected from the group consisting of a helical spring, a gas spring, a hydraulic spring, and a magnetic component.

34. The fastener of claim 22, wherein the fastener does not include a ferrule.

\* \* \* \* \*